United States Patent
Nakashima et al.

(10) Patent No.: US 7,995,260 B2
(45) Date of Patent: Aug. 9, 2011

(54) LIGHT SCANNING DEVICE AND IMAGE FORMING APPARATUS

(75) Inventors: Hirokazu Nakashima, Kiyosu (JP); Naoki Abe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 567 days.

(21) Appl. No.: 12/109,658

(22) Filed: Apr. 25, 2008

(65) Prior Publication Data

US 2008/0266634 A1    Oct. 30, 2008

(30) Foreign Application Priority Data

Apr. 26, 2007   (JP) ................. 2007-117090

(51) Int. Cl.
*G02B 26/08* (2006.01)
(52) U.S. Cl. .......... 359/213.1; 359/214.1; 250/235; 347/250
(58) Field of Classification Search .... 350/199.1–199.4, 350/213.1–215.1, 223.1–224.1; 250/234–236; 347/235, 250
See application file for complete search history.

(56) References Cited

U.S. PATENT DOCUMENTS

2008/0239445 A1   10/2008   Ando

FOREIGN PATENT DOCUMENTS

| JP | 1-285533 | 11/1989 |
|---|---|---|
| JP | 06-024586 | 2/1994 |
| JP | 09-052387 | 2/1997 |
| JP | 11-059921 | 3/1999 |
| JP | 2004-230629 | 8/2004 |
| JP | 2005-349622 | 12/2005 |
| JP | 2005-349623 | 12/2005 |
| JP | 2008-256778 A | 10/2008 |

OTHER PUBLICATIONS

JP Office Action dtd Dec. 16, 2008, JP Appln. 2007-117090 (partial English Translation).

*Primary Examiner* — James Phan
(74) *Attorney, Agent, or Firm* — Banner & Witcoff, Ltd.

(57) ABSTRACT

A light scanning device is provided. The light scanning device includes: an oscillating mirror which oscillates rotationally and reflects a light beam to be scanned over a scanning range, the scanning range including a first scanning range and a second scanning range set across a center of the scanning range; a detection unit including a light receiving face, on which the light beam is incident, to detect the light beam; and first and second stationary mirrors which reflect the light beam reflected by the oscillating mirror to the first scanning range and the second scanning range, respectively, to be incident on the light receiving face, wherein an incident pattern of the light beam reflected by the first stationary mirror incident on the light receiving face is different from an incident pattern of the light beam reflected by the second stationary mirror incident on the light receiving face.

9 Claims, 15 Drawing Sheets

LIGHT SCANNING DEVICE AND IMAGE FORMING APPARATUS

CROSS-REFERENCE TO RELATED APPLICATION

This application claims priority from Japanese Patent Application No. 2007-117090, filed on Apr. 26, 2007, the entire subject matter of which is incorporated herein by reference.

TECHNICAL FIELD

Aspects of the present invention relate to a light scanning device and an image forming apparatus, and more particularly to a light scanning device with using an oscillating mirror which oscillates rotationally, and an image forming apparatus which electro-photographically forms an image using the light scanning device.

BACKGROUND

In recent years, a light scanning device for making scanning with using an oscillating mirror which oscillates rotationally in reciprocating manner by a sinusoidally oscillating element such as a galvanometer has been proposed, in stead of a light scanning device for making scanning by deflecting a light beam with a polygon mirror that rotates at a constant speed. And also, an image forming apparatus which electro-photographically forms an image with using such light scanning device has been proposed. Since the light scanning device of this kind can scan the light beam reciprocally, it is considered that a detection unit such as a BD sensor for determining a write timing for one way and a detection unit such as a BD sensor for determining a write timing for the other way are provided and the image is written by scanning in both ways.

However, if a plurality of detection unit such as BD sensors is provided, the manufacturing costs increase. Thus, it has been proposed that if one BD sensor detects a light beam to generate a BD signal, a counter is activated to generate a pseudo BD signal instead of another BD sensor (e.g., refer to JP-A-2004-230629).

However, in generating the pseudo BD signal using the counter as described above, a process or a circuit configuration becomes complex and the sufficient accuracy is not attained. Thus, it has been proposed that two stationary mirrors for reflecting the scanned light beam to the BD sensor are provided, whereby one BD sensor detects the timings for both ways in FIG. 9 of JP-A-2004-230629. However, even if the BD sensor detects the light beam in this case, it can not be determined which one of the stationary mirrors the light beam is reflected. Therefore, in a case where two stationary mirrors are provided as shown in FIG. 9 of JP-A-2004-230629, there is possibility that the image to be written during scanning for one way is written during scanning in the other way, to form a laterally reversed image.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a light scanning device, in which an image write timing for one way data and an image write timing for the other way data can be correctly detected without being transposed, even though only one detection unit such as a BD sensor is provided, and the image forming apparatus using the light scanning device.

According to an exemplary embodiment of the present invention, there is provide a light scanning device comprising: a light source which emits a light beam; an oscillating mirror which oscillates rotationally and reflects the light beam to be scanned over a scanning range, the scanning range including a first scanning range and a second scanning range set across a center of the scanning range; a detection unit including a light receiving face, on which the light beam is incident, to detect the light beam; and first and second stationary mirrors which reflect the light beam reflected by the oscillating mirror to the first scanning range and the second scanning range, respectively, to be incident on the light receiving face of the detection unit. An incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates.

According to another exemplary embodiment of the present invention, there is provided a light scanning device comprising: a light source which emits a light beam; an oscillating mirror which oscillates rotationally and reflects the light beam to be scanned over a scanning range, the scanning range including a first scanning range and a second scanning range set across a center of the scanning range; a detection unit including a light receiving face, on which the light beam is incident, to detect the light beam; and a stationary mirror which reflect the light beam reflected by the oscillating mirror to the first scanning range to be incident on the light receiving face of the detection unit. The light beam reflected by the oscillating mirror to the second scanning range is directly incident on the light receiving face of the detection unit. An incident pattern of the light beam reflected by the first stationary mirror incident on the light receiving face of the detection unit while the oscillating mirror oscillates is different from an incident pattern of the light beam directly incident on the light receiving face of the detection unit while the oscillating mirror oscillates.

According to a further exemplary embodiment of the present invention, there is provided an image forming apparatus comprising: a light scanning device comprising: a light source which emits a light beam; an oscillating mirror which oscillates rotationally and reflects the light beam to be scanned over a scanning range, the scanning range including a first scanning range and a second scanning range set across a center of the scanning range; a detection unit including a light receiving face, on which the light beam is incident, to detect the light beam; and first and second stationary mirrors which reflect the light beam reflected by the oscillating mirror to the first scanning range and the second scanning range, respectively, to be incident on the light receiving face of the detection unit, wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates; a modulation unit which modulates the light beam emitted from the light source based on a detection timing of the light beam with the detection unit and image data of an image to be formed; a photoconductor on which an electrostatic latent image is formed by applying the light beam from the light scanning device; a developing unit which develops an electrostatic latent image formed on the photoconductor by depositing a developer; and a transfer unit which transfers the developer deposited by the developing unit onto a recording medium.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

[Overall Configuration of Laser Printer 1]

Figure 1:
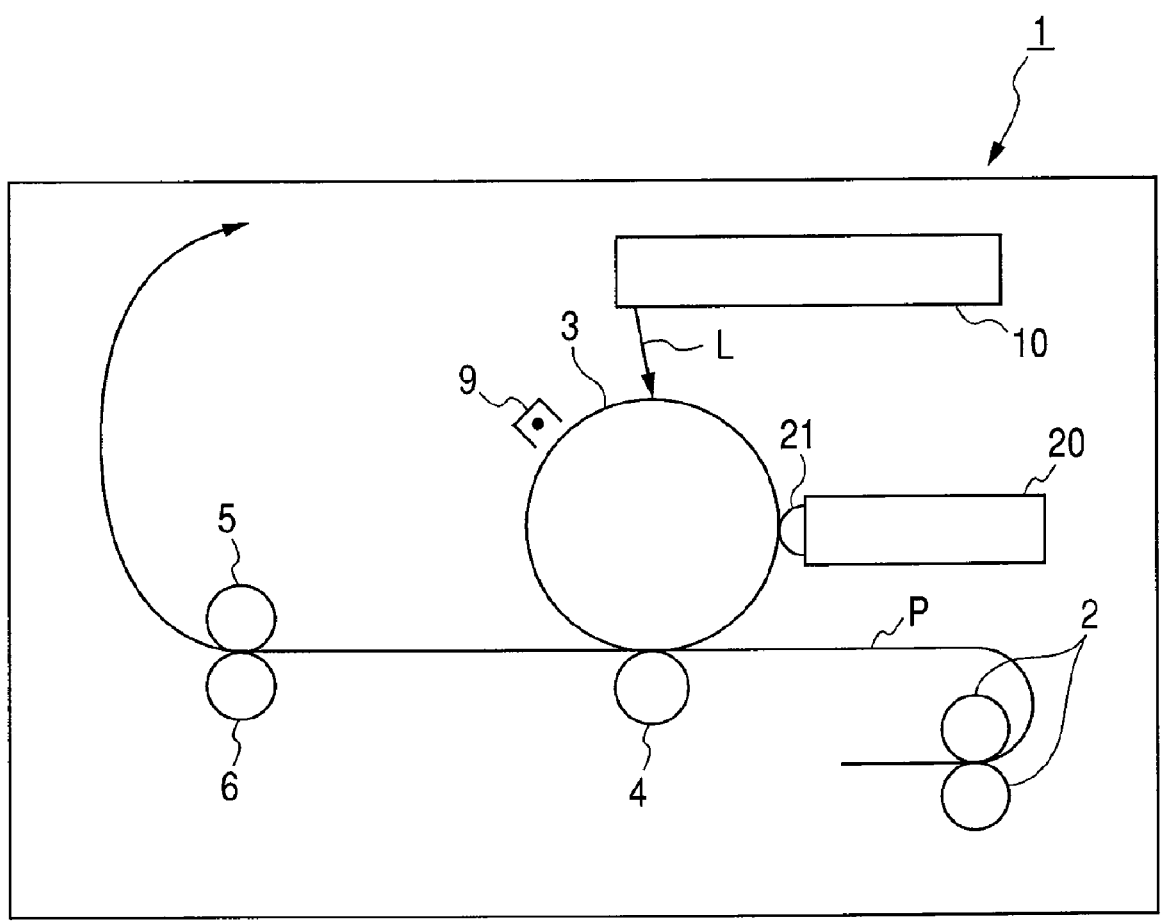
FIG. 1 is an explanatory view schematically showing the configuration of a laser printer according to an exemplary embodiment of the present invention.

An exemplary embodiment of the present invention will be described with reference to the accompanying drawings. FIG. 1 is an explanatory view schematically showing the configuration of a laser printer 1 as an example of an image forming apparatus. The laser printer 1 comprises a pair of conveying rollers 2 for conveying a sheet P as an example of a recording medium supplied one by one from a sheet feed tray (not shown) as shown in FIG. 1. The sheet P conveyed by the conveying rollers 2 is passed between a photosensitive drum 3 as an example of a photoconductor and a transfer roller 4 as an example of a transfer unit, further passed between a heating roller 5 and a pressing roller 6, and discharged onto a sheet output tray (not shown) provided on an upper surface of the laser printer 1.

The photosensitive drum 3 includes a drum main body and a positively charged photosensitive layer formed on the surface of the drum main body. The positively charged photosensitive layer is made of an organic photosensitive material, for example, polycarbonate, on the surface thereof. The drum main body is grounded, and is supported on the laser printer 1 to be rotatable in a clockwise direction in FIG. 1.

Around the outer periphery of the photosensitive drum 3, a charger unit 9, a laser scanner unit 10 as an example of a light scanning device, and a developing unit 20 are disposed, besides the transfer roller 4, from an upstream side in the rotational direction. The charger unit 9 is a scorotron type charger for positive charge and generates a corona discharge from a charging wire made of tungsten or the like. The charger unit 9 is configured to positively and uniformly charge the surface of the photosensitive drum 3. The laser scanner unit 10 scans a laser beam L over the photosensitive drum 3 with a mechanism described later. The developing unit 20 supplies a positively charged toner (not shown) via a developing roller 21 onto the surface of the photosensitive drum 3. In this exemplary embodiment, a positively chargeable, non-magnetic one component polymerized toner is employed as the toner.

In the course of forming toner image, at first, the surface of the photosensitive drum 3 is positively charged by the charger unit 9 uniformly along with the rotation of the photosensitive drum 3. The photosensitive drum 3 is exposed by fast scanning of a laser beam L from the laser scanner unit 10, and formed with an electrostatic latent image according to print data as an example of image data. The positively charged toner is supplied to the photosensitive drum 3 by the developing unit 20. The supplied toner is selectively deposited on the electrostatic latent image formed on the surface of the photosensitive drum 3, namely, an exposed part of the surface of the photosensitive drum 3 which is positively charged uniformly, and exposed by the laser beam L and having a lower potential. Accordingly, the electrostatic latent image is visualized and a toner image is formed.

The transfer roller 4 is supported on the laser printer 1 to be rotatable in a counterclockwise direction in FIG. 1. This transfer roller 4 includes a metallic roller shaft and a rubber material having ion conduction property covering around the metallic roller shaft. A transfer bias (forward transfer bias) is applied from a transfer bias power source (not shown) at the time of transfer. Therefore, the toner deposited on the surface of the photosensitive drum 3 is transferred onto the sheet P while the sheet P is passed between the photosensitive drum 3 and the transfer roller 4. The sheet P with the toner transferred is sandwiched between the heating roller 5 and the pressing roller 6 to thermally fix the toner on the sheet P, and discharged onto the sheet discharge tray.

[Configuration of Laser Scanner Unit 10 (First Exemplary Embodiment)]

Figure 2:
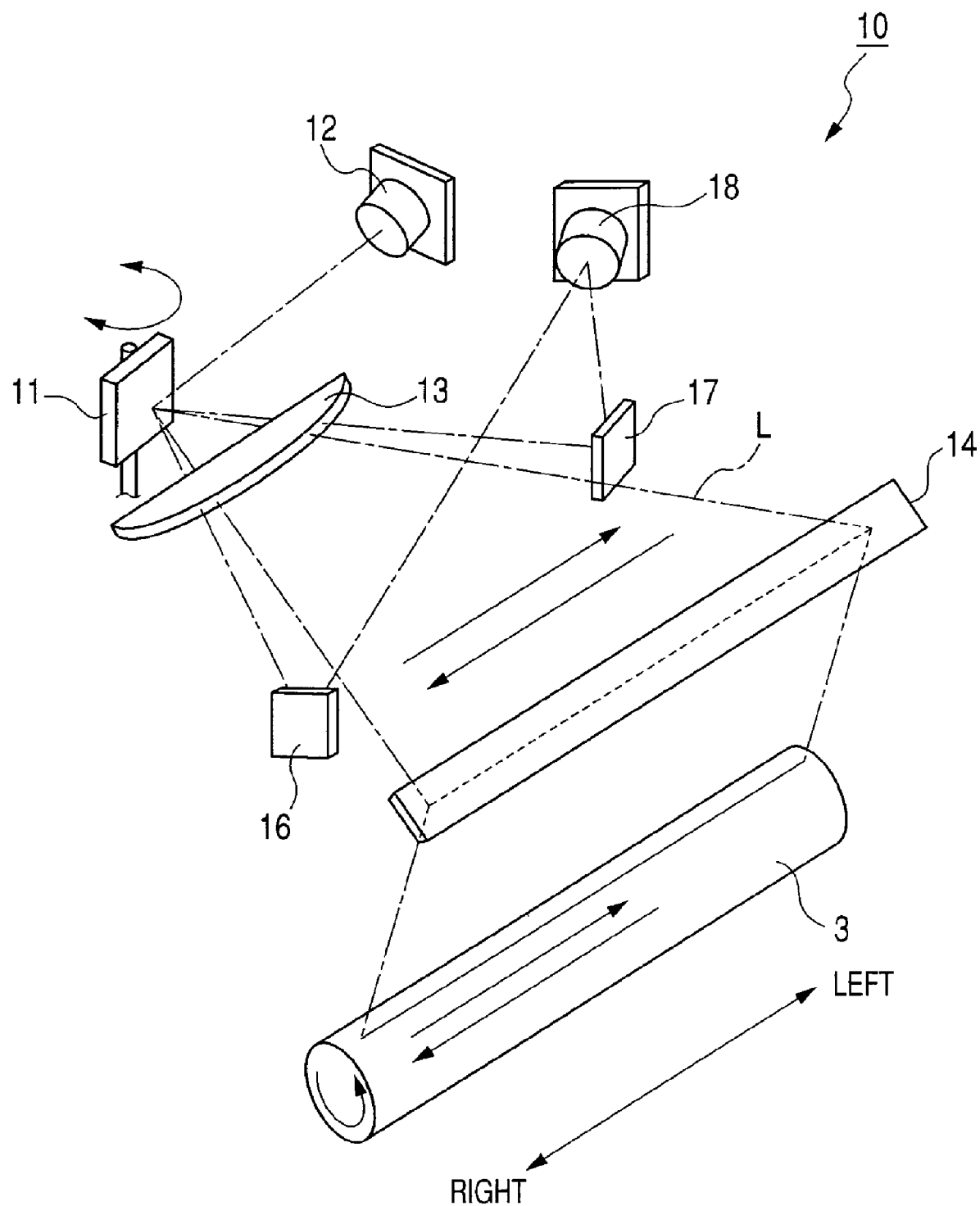
FIG. 2 is a perspective view showing the internal configuration of a laser scanner unit of the laser printer.

FIG. 2 is a perspective view showing the internal configuration of the laser scanner unit 10 according to a first exemplary embodiment. The laser scanner unit 10 includes an oscillating mirror 11 which oscillates rotationally in reciprocating manner about a vertical axis by a sinusoidal oscillating element (not shown), and a laser diode 12 as an example of a light source that emits a laser beam L to the oscillating mirror 11, as shown in FIG. 2.

The laser beam L reflected from the oscillating mirror 11 is scanned at a given amplitude (hereinafter referred to as a scanning amplitude). And, the laser beam L reflected from the oscillating mirror 11 passes through an F arc sine θ lens 13 as an example of a part of an optical system, and is reflected from a reflecting mirror 14 to reach the photosensitive drum 3. The F arc sine θ lens 13 is a lens having the relationship of r=f·arcsin θ (f is a focal length of the lens) between the incident angle θ and the image forming position r, and adjusted so that the laser beam L would be scanned over the photosensitive drum 3 disposed on a scanning line at an equal speed in the scanning direction (the axial direction of the photosensitive drum 3).

Also, the light guide mirrors 16 and 17 as an example of a stationary mirror which reflects the laser beam L to left and right with respect to the scanning center are disposed in an area which is inside the scanning range of the laser beam L and outside the range where the laser beam L is reflected from the reflecting mirror 14 toward the photosensitive drum 3. Further, the laser scan unit 10 has a BD sensor 18 as an example of a detection unit which detects the laser beam L reflected from the light guide mirrors 16 and 17. That is, the light guide mirrors 16 and 17 are disposed at an angle where the laser beam L received by each light guide mirror is reflected to a light receiving plane of the BD sensor 18. Therefore, the modulation timing of the laser diode 12 can be adjusted during scanning in the both directions of the photosensitive drum 3, based on the timing at which the BD sensor 18 detects the laser beam L.

Figure 3:
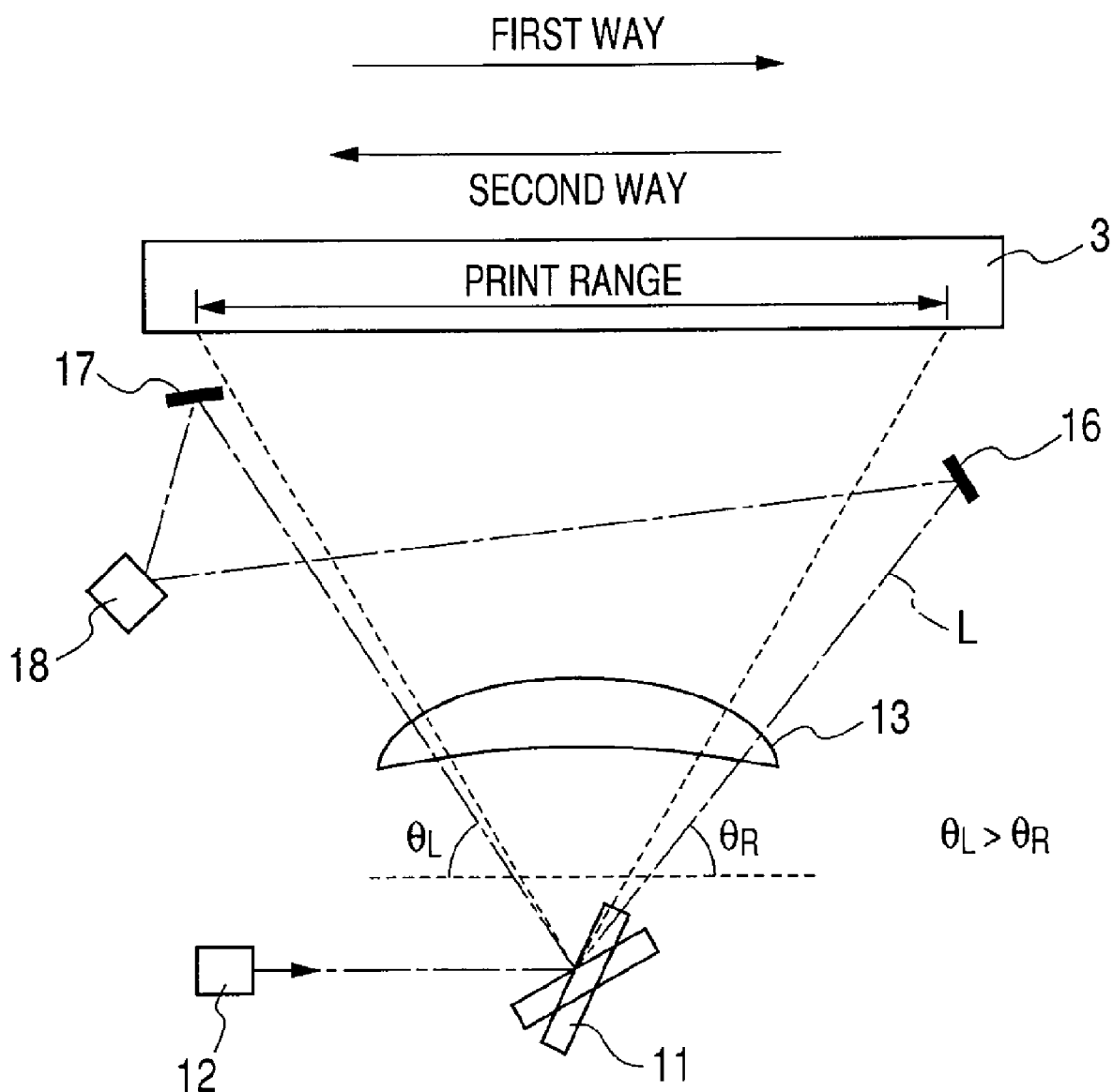
FIG. 3 is an explanatory view schematically showing the internal configuration of a laser scanner unit according to a first exemplary embodiment of the present invention.

Specifically, the light guide mirror 16 as an example of a second stationary mirror is disposed on the right side of the oscillating mirror 11 facing toward the photosensitive drum 3 (hereinafter simply referred to as the right side), and the light guide mirror 17 as an example of a first stationary mirror is disposed on the left side of the oscillating mirror 11 facing toward the photosensitive drum 3 (hereinafter simply referred to as the left side). The arrangement of the light guide mirror 16 and the light guide mirror 17 with respect to the scanning center is asymmetrical, as shown in FIG. 3. That is, an angle $\theta_L$ made by the direction of the laser beam L leading from the oscillating mirror 11 to the light guide mirror 17 with respect to the scanning direction (photosensitive drum shaft direction) is larger than an angle $\theta_R$ made by the direction of the laser beam L leading from the oscillating mirror 11 to the light guide mirror 16 with respect to the scanning direction (photosensitive drum shaft direction). In other words, an angle between a direction from the oscillating mirror 11 to the scanning center and a direction from the oscillating mirror 11 to the light guide mirror 16 is different from an angle between a direction from the oscillating mirror 11 to the scanning center and a direction from the oscillating mirror 11 to the light guide mirror 17. Therefore, when the BD sensor 18 detects the laser beam L reflected from the light guide mirror 16 and when the BD sensor 18 detects the laser beam L reflected from the light guide mirror 17, the incident pattern of the laser beam L on the light receiving plane of the BD sensor 18 is varied in the following manner.

For example, when the laser beam L is scanned to the left (hereinafter also referred to as a second way), the laser beam L applied to the light guide mirror 17 is further scanned to the left until the scanning direction is changed to the right (hereinafter also referred to as a first way), and is applied to the light guide mirror 17 again. And after the laser beam L is scanned over the photosensitive drum 3 in the first way, the laser beam L is applied to the light guide mirror 16 and is further scanned to the right until the scanning direction is changed to the second way. And, the laser beam L is applied to the light guide mirror 16 again. Therefore, the interval $t_A$ at which the BD sensor 18 detects the laser beam L from the light guide mirror 17 consecutively twice is longer than the interval $t_B$ at which the BD sensor 18 detects the laser beam L from the light guide mirror 16 consecutively twice, as shown in a time chart of FIG. 4. Thus, the following control is made using a difference between the detection intervals $t_A$ and $t_B$ in the first exemplary embodiment.

Configuration and Control of a Control System in the Laser Printer 1 (First Exemplary Embodiment)

Figure 5:
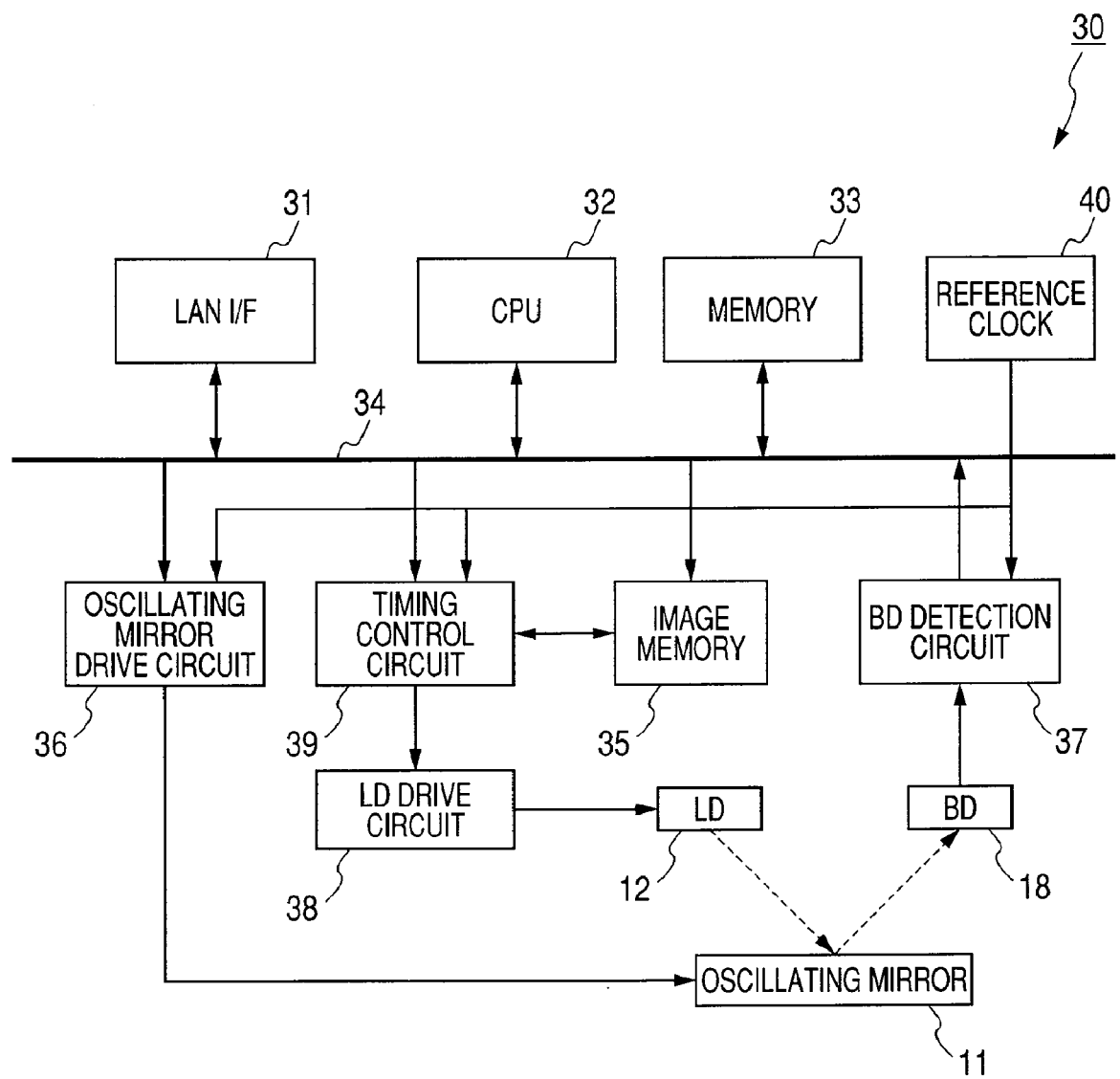
FIG. 5 is a block diagram showing the configuration of a control system of the laser printer.

FIG. 5 is a block diagram showing the configuration of a controller 30 in the laser printer 1 in respect of a section relevant to the laser scanner unit 10. The controller 30 is configured as a microcomputer including a LAN interface (LAN I/F) 31 for connecting to a LAN (not shown), a CPU 32 for performing various kinds of operations, and a memory 33 which are connected via a bus 34, as shown in FIG. 5. Further, an image memory 35 in which print data inputted via the LAN interface 31 is expanded as the two-dimensional image, an oscillating mirror drive circuit 36 for driving the oscillating mirror 11, a BD detection circuit 37 for reading and comparing an output signal of the BD sensor (BD) 18 with a predetermined threshold value, and a timing control circuit 39 as an example of a modulation controller which instructs an emission timing of the laser diode 12 to an LD drive circuit 38 for driving the laser diode (LD) 12 are connected to the bus 34. Also, a common reference clock 40 is inputted into the oscillating mirror drive circuit 36, the BD detection circuit 37 and the timing control circuit 39. The oscillating mirror drive circuit 36, the BD detection circuit 37 and the timing control circuit 39 perform driving of the oscillating mirror 11, the sampling of the output signal of the BD sensor 18, and the control of the emission timing based on this clock.

Figure 6:
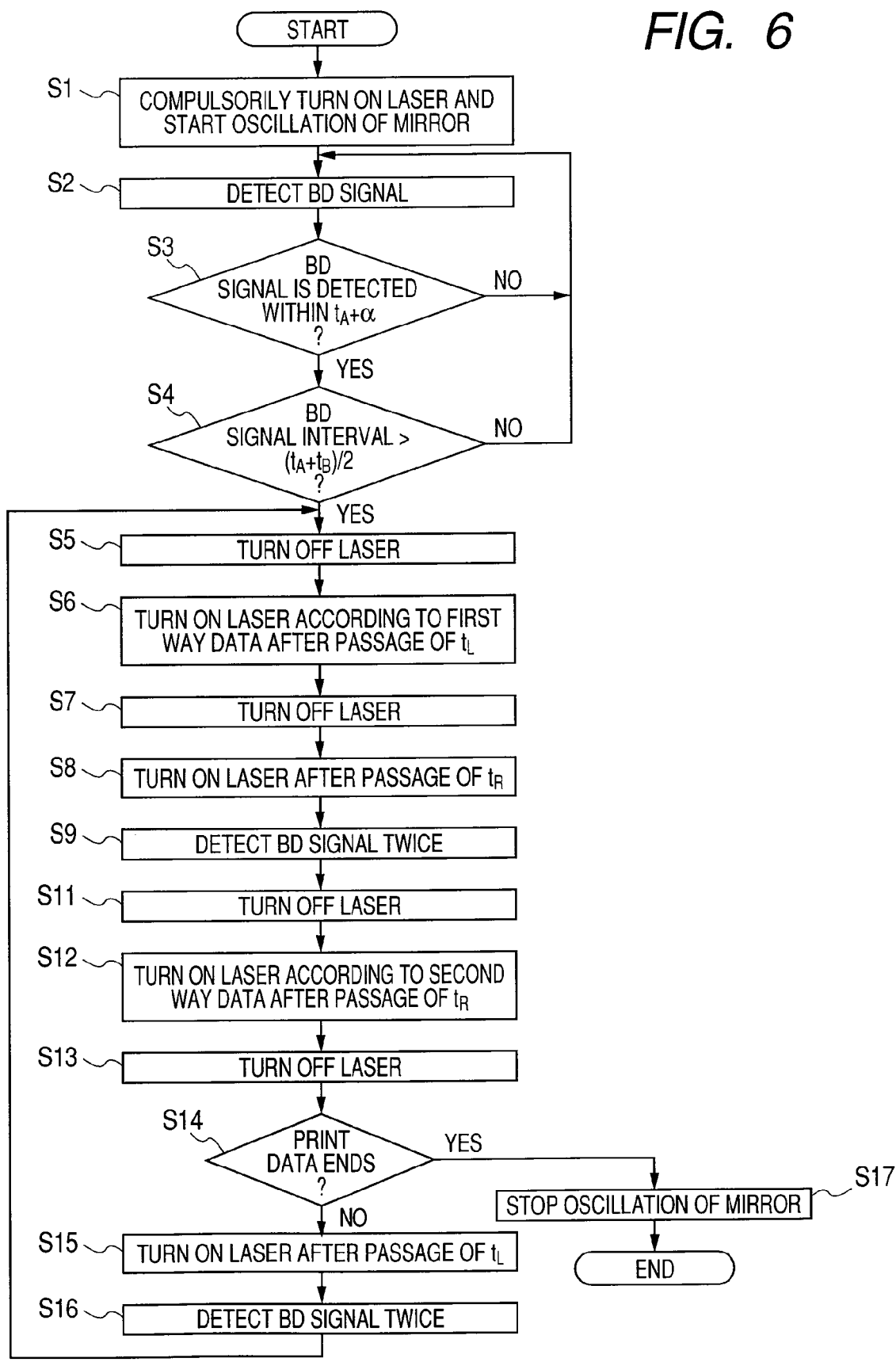
FIG. 6 is a flowchart showing a process performed by the control system.

Referring to a flowchart of FIG. 6, a process performed by this controller 30 will be described below. In this process, first of all, the laser diode 12 is compulsorily lighted and the oscillation of the oscillating mirror 11 is started at operation S1 (S denotes a step; the same below), as shown in FIG. 6. At following operation S2, the process waits until a BD signal that the BD sensor 18 generates at the time of detecting the laser beam L is detected, and if the BD signal is detected, the process proceeds to operation S3.

At operation S3, it is determined whether or not another BD signal is detected within $t_A+\alpha$ ($\alpha$ is a minute value for absorbing a variation of $t_A$) before the BD signal is detected. If another BD signal is not detected within $t_A+\alpha$ (S3: No), the process retunes to operation S2 to detect the BD signal. On the other hand, if another BD signal is detected within $t_A+\alpha$ (S3: Yes), the process proceeds to operation S4, where it is determined whether or not the interval of the BD signal is larger than $(t_A+t_B)/2$. If the interval of the BD signal is larger than $(t_A+t_B)/2$ (S4: Yes), taking the analysis described above into the consideration, the BD signal is the signal of detecting the laser beam L from the light guide mirror 17. Whereas if the interval of the BD signal is smaller than $(t_A+t_B)/2$ (S4: No), the BD signal is the signal of detecting the laser beam L from the light guide mirror 16. Thus, in the latter case, the process returns to operation S2. Whereas in the former case, the process proceeds to the following operation S5.

At operation S5, the laser diode 12 is turned off. At the next operation S6, the laser diode 12 is modulated and lighted in accordance with the first way data after the passage of time $t_L$. The time $t_L$ is the time required for the laser beam to move between the light guide mirror 17 and the print range (see FIG. 3) on the photosensitive drum 3 when the laser beam L is scanned. Also, the first way data is data corresponding to the first way in scanning the print data (video data) expanded over the image memory 35 in both the first way and the second way. And if the lighting of the laser diode 12 according to the first way data for one line corresponding to the entire width of the print range ends, the process proceeds to operation S7, where the laser diode 12 is turned off. It is noted that the drive states of the laser diode 12 according to the process from operation S5 to operation S16 are described in FIG. 4.

At the next operation S8, the laser diode 12 is lighted after the passage of the time $t_R$ required for the laser beam L to move between the print range and the light guide mirror 16. At the next operation S9, the process waits until the BD signal is detected twice. And if the BD signal is detected twice, the laser diode 12 is turned off at operation S11. At the following operation S12, the laser diode 12 is modulated and lighted according to the second way data after the passage of the time $t_R$. And if the lighting of the laser diode 12 according to the second way data for one line corresponding to the entire width of the print range ends, the process proceeds to operation S13, where the laser diode 12 is turned off.

At the following operation S14, it is determined whether or not all the process for print data ends. If any unprocessed print data is left (S14: No), the process transfers to operation S15, where the laser diode 12 is lighted after the passage of the time $t_L$. Further, at operation S16, the process waits until the BD signal is detected twice. And if the BD signal is detected twice, the process returns to operation S5 as previously described. In this manner, the process from operation S5 to operation S16 is repeated until an electrostatic latent image corresponding to the print data is formed on the photosensitive drum 3, thereby making it possible to form the image on the sheet P. And if all the process for print data ends by repeating the process from operation S5 to operation S16 (S14: Yes), the oscillation of the oscillating mirror 11 is stopped at operation S17 and the process ends.

Effect of the First Exemplary Embodiment

According to the first exemplary embodiment, since the interval $t_B$ at which the laser beam L from the light guide mirror 16 is detected twice and the interval $t_A$ at which the laser beam L from the light guide mirror 17 is detected twice are different, the image write timing for first way data and the image write timing for second way data can be correctly detected without being transposed, even though only one BD sensor is provided. Accordingly, in the laser printer 1, the correct image can be formed while the manufacturing costs are suppressed. And the laser scanner unit 10 can be reduced in size by using the oscillating mirror 11 as compared with the case of using the polygon mirror, whereby the laser printer 1 can be reduced in size.

Second Exemplary Embodiment

Figure 7:
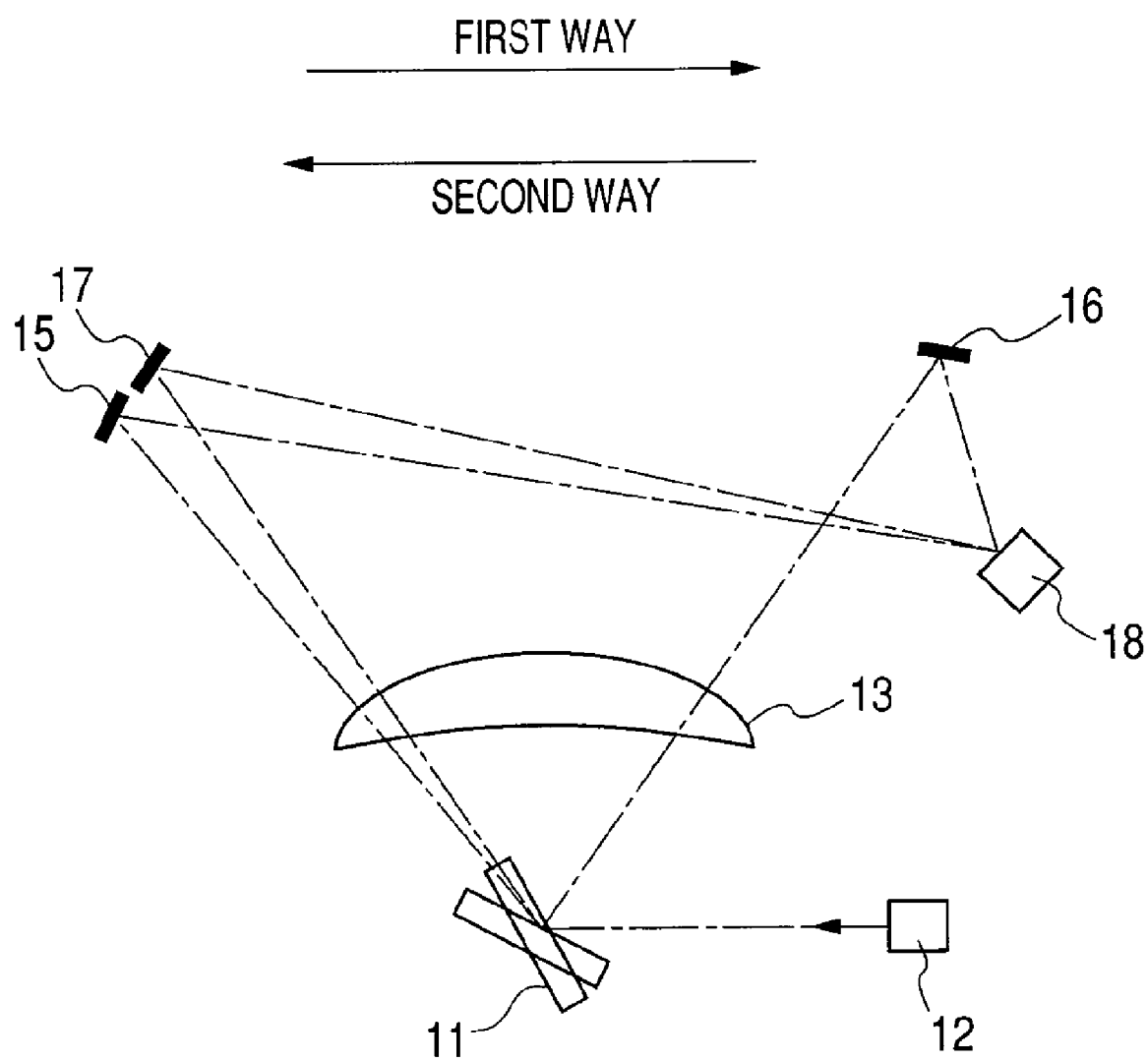
FIG. 7 is an explanatory view schematically showing the configuration of a laser scanner unit according to a second exemplary embodiment of the present invention.

FIG. 7 is an explanatory view schematically showing the internal configuration of the laser scanner unit 10 according to a second exemplary embodiment. Though the light guide mirrors 16 and 17 are provided in almost symmetry with respect to the scanning center in this second exemplary embodiment as shown in FIG. 7, another light guide mirror 15 as an example of the first stationary mirror is provided adjacent to the light guide mirror 17 as an example of the first stationary mirror. Also, the arrangement of the laser diode 12 and the BD sensor 18 is changed as compared with that of the first exemplary embodiment.

Figure 4:
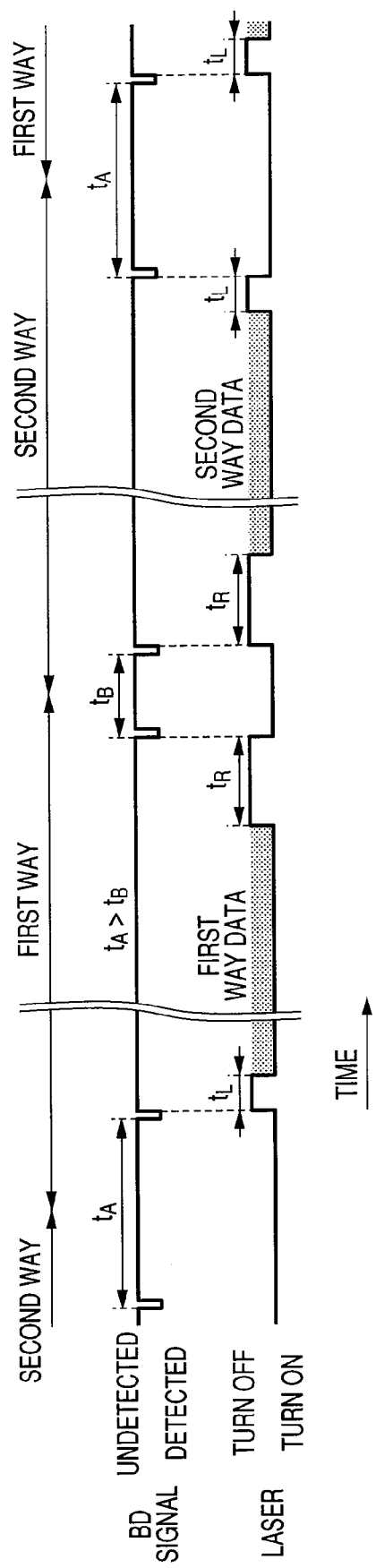
FIG. 4 is a time chart showing the operation of the laser scanner unit according to the first exemplary embodiment.
Figure 8:
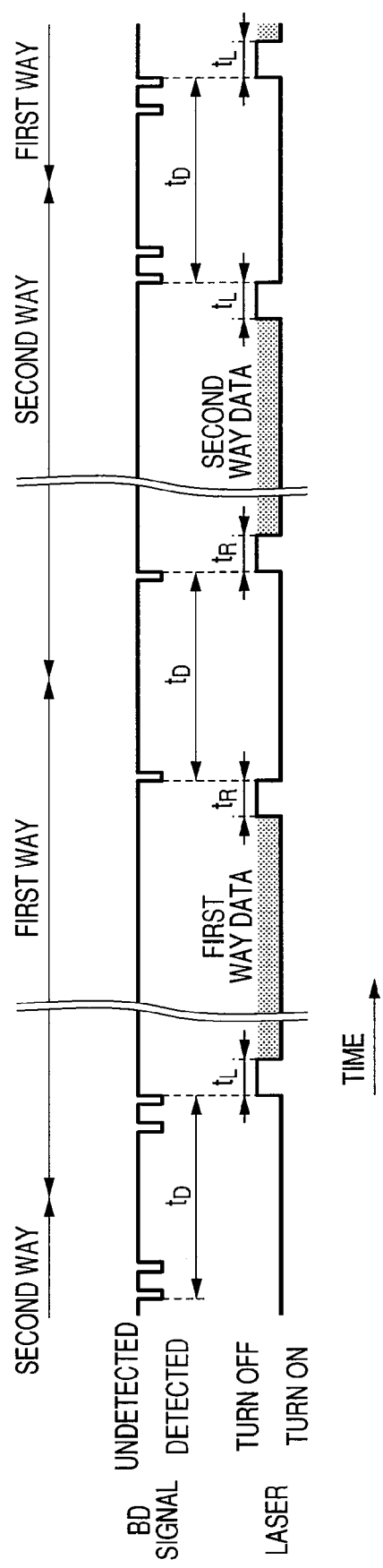
FIG. 8 is a time chart showing the operation of the laser scanner unit according to the second exemplary embodiment.

The detection pattern of a BD signal is shown in a time chart of FIG. 8. That is, since the light guide mirrors 16 and 17 are provided in almost symmetry in this case, the times corresponding to $t_A$ and $t_B$ in FIG. 4 are equal. In FIG. 8, therefore, the times are added with BD signal pulse width and denoted as $t_D$. When the scanning direction is changed from the second way to the first way as shown in FIG. 8, the laser beam L is incident from the light guide mirrors 15 and 17 twice for each, so that the BD signal is detected four times. When the scanning direction is changed from the first way to the second way, the BD signal is detected twice as in the first exemplary embodiment.

Figure 9:
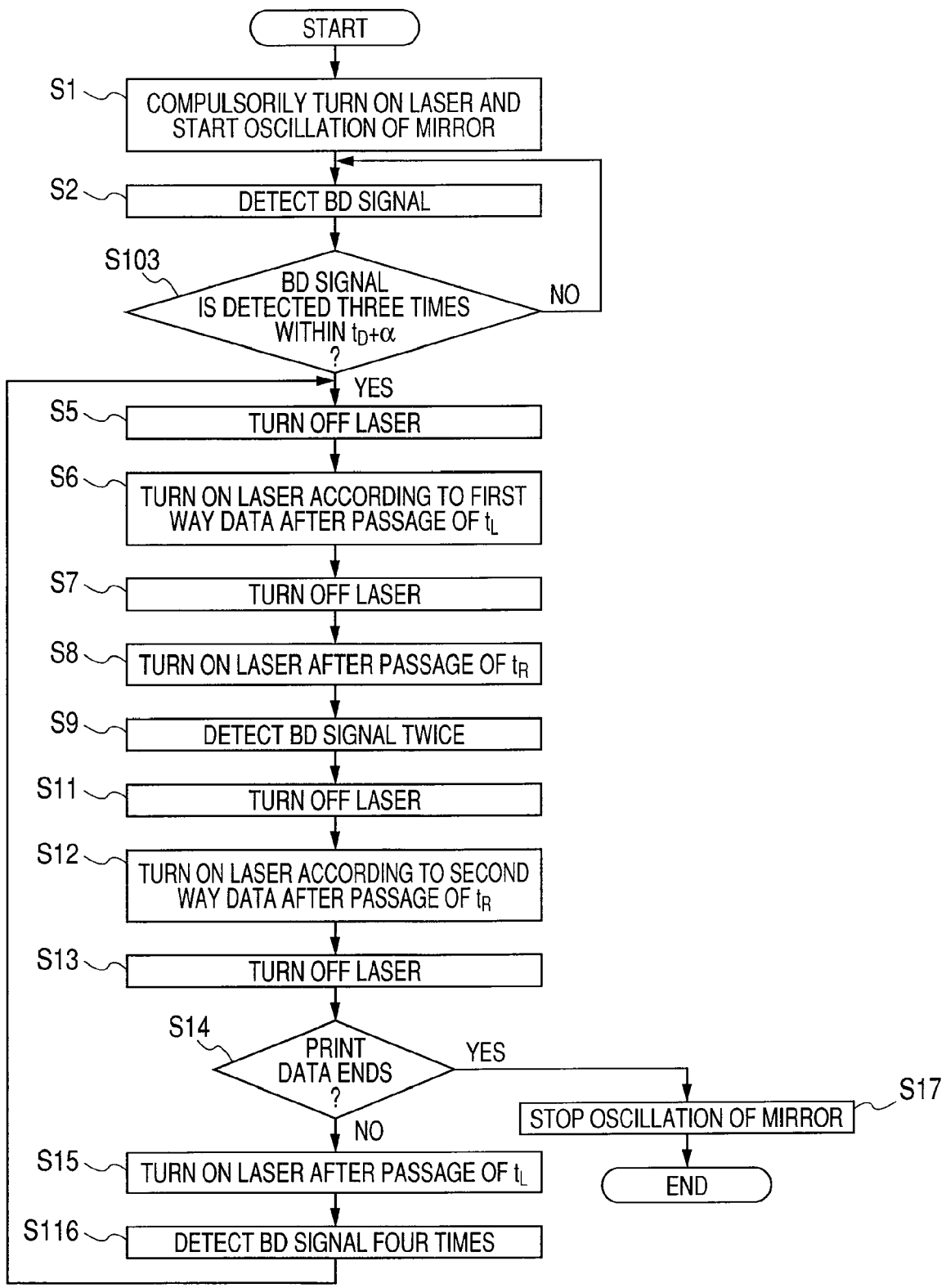
FIG. 9 is a flowchart showing a process of the laser scanner unit according to the second exemplary embodiment.

Thus, in the second exemplary embodiment, a control is performed as shown in a flowchart of FIG. 9. Since the process of FIG. 9 is almost same as the process of FIG. 6, only the different operations from FIG. 6 will be described below.

In this process, at operation S103 instead of operation S3 and operation S4, it is determined whether or not the BD signal is detected three times within $t_D+\alpha$ as shown in FIG. 9. And if it is not detected three times (S103: No), the process proceeds to operation S2 to detect the next BD signal. On the other hand, if the BD signal is detected three times within $t_D+\alpha$ (S1103: Yes), the process is on the first way (see FIG. 8), whereby the process proceeds to operation S5, which is previously described. Also, in this second exemplary embodiment, when the scanning direction is changed from the second way to the first way, the BD signal is detected four times, whereby at operation S116 instead of operation S16, the process proceeds to operation S5 after waiting until the BD signal is detected four times. In this second exemplary embodiment, the image write timing for first way data and the image write timing for second way data can be correctly detected without being transposed, even though only one BD sensor is provided.

Third Exemplary Embodiment

Figure 10A:
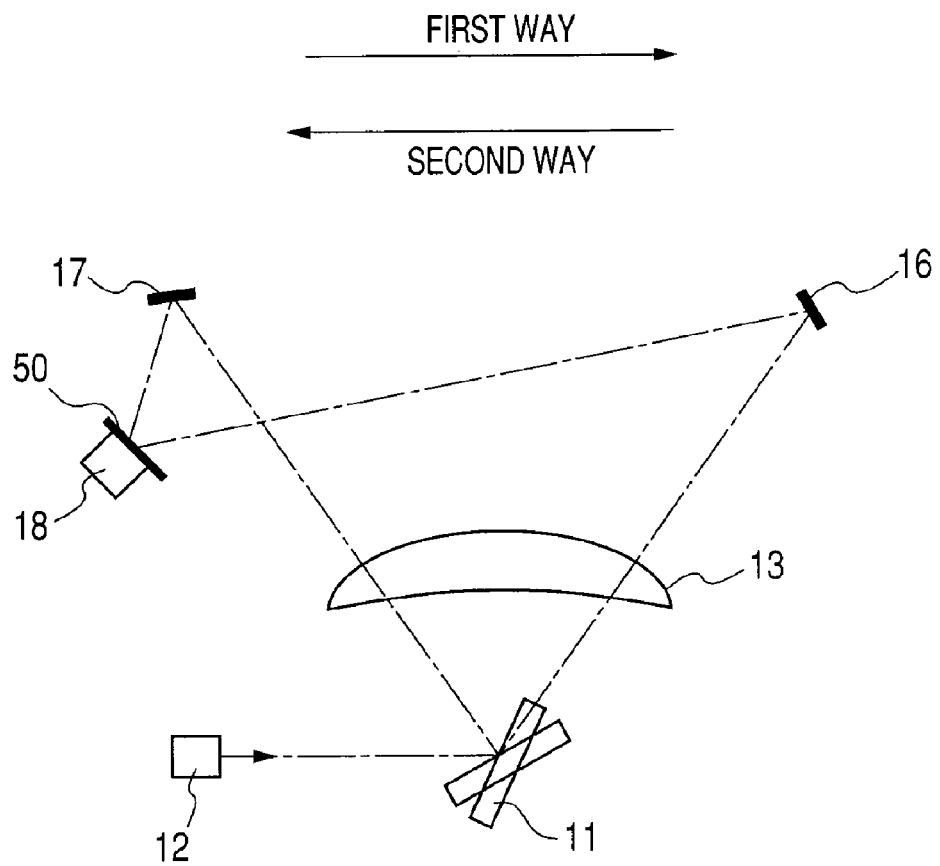
FIG. 10A is an explanatory view schematically showing the configuration of a laser scanner unit according to a third exemplary embodiment of the present invention and FIG. 10B is a front view showing the configuration of a slit plate for use in the laser scanner unit according to the third exemplary embodiment.
Figure 10B:
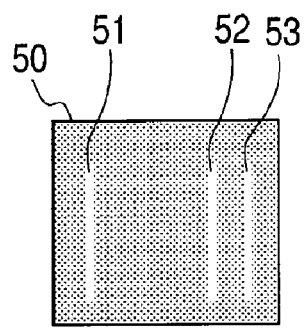

FIG. 10A is an explanatory view schematically showing the internal configuration of a laser scanner unit 10 according to a third exemplary embodiment. In this third exemplary embodiment, though the light guide mirrors 16 and 17 are provided in almost symmetry with respect to the scanning center, a slit plate 50 is disposed in front of the light receiving plane of a BD sensor 18, as shown in FIG. 10A. FIG. 10B is a front view showing the slit plate 50 as seen from the light guide mirrors 16 and 17. The slit plate 50 includes three opening holes 51, 52 and 53 that extend vertically. The opening holes 52 and 53 are closer to each other that the opening hole 51, as shown in FIG. 10B. That is, an arrangement of the opening holes 51, 52 and 53 is asymmetrical in a scanning direction of the light beam L by the oscillating mirror 11. When the laser beam L is scanned in the second way, the laser beam L is applied on the slit plate 50 from the left to the right in FIG. 10B, whereas when the laser beam L is scanned in the first way, the laser beam L is applied on the slit plate 50 from the right to the left in FIG. 10B.

Figure 11:
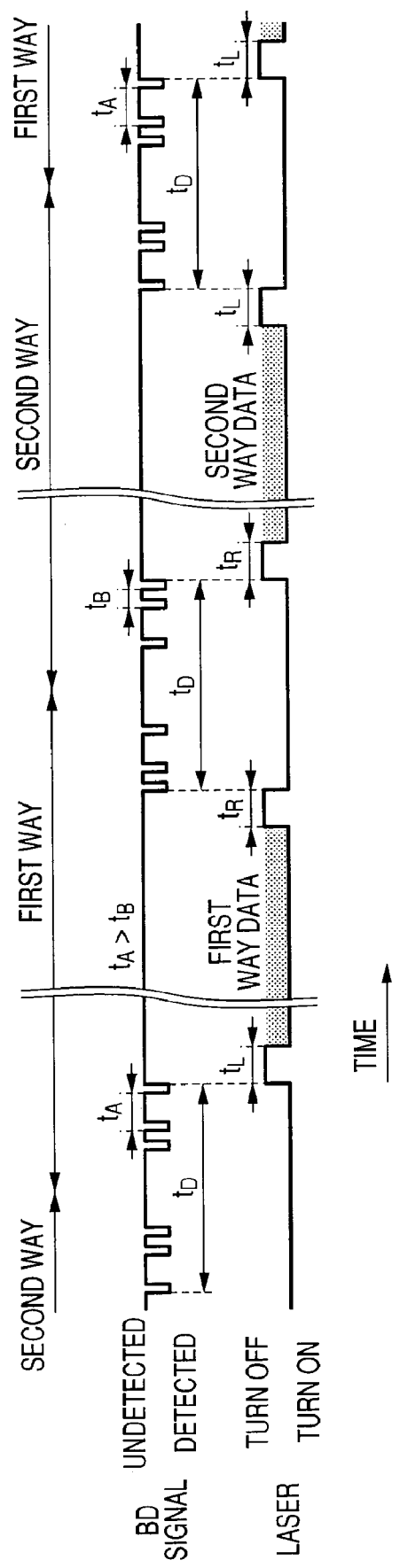
FIG. 11 is a time chart showing the operation of the laser scanner unit according to the third exemplary embodiment.

The detection pattern of a BD signal is shown in a time chart of FIG. 11. That is, in this case, when the laser beam L is scanned in the second way, the BD signal corresponding to the opening hole 51 is detected, and then the BD signals corresponding to the opening holes 52 and 53 are detected proximately in time. Conversely, when the laser beam L is scanned in the first way, the BD signals corresponding to the opening holes 53 and 52 are detected proximately in time, and then the BD signal corresponding to the opening hole 51 is detected. Herein, it is assumed that the interval between the BD signal corresponding to the opening hole 51 and the BD signal corresponding to the opening hole 52 is $t_A$ and the interval between the BD signal corresponding to the opening hole 52 and the BD signal corresponding to the opening hole 53 is $t_B$.

Figure 12:
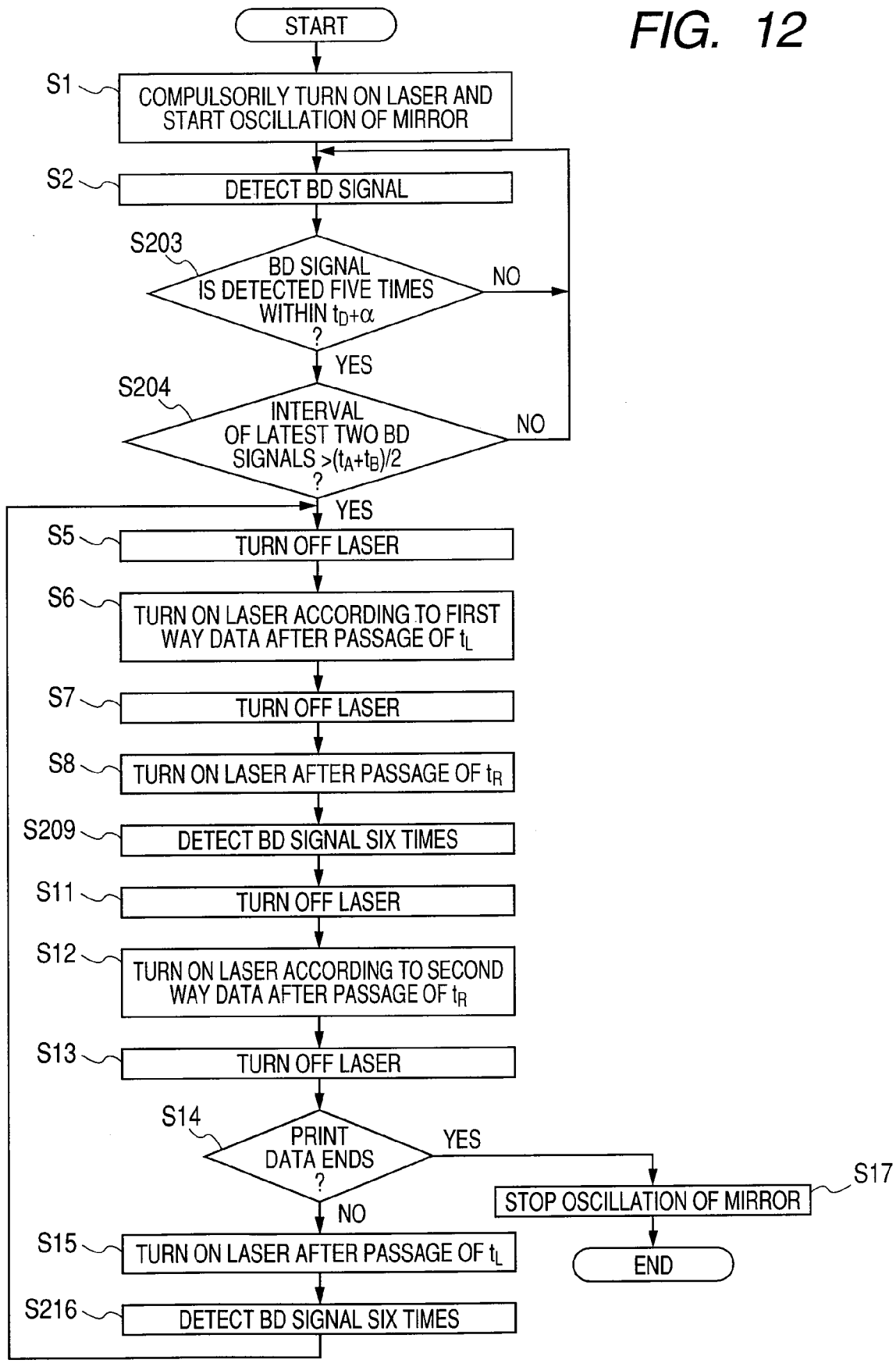
FIG. 12 is a flowchart showing a process with the laser scanner unit according to the third exemplar embodiment.

In this third embodiment, a control is provided as shown in a flowchart of FIG. 12. Since the process of FIG. 12 is almost same as the process of FIG. 6, only the different operations from FIG. 6 will be described below.

In this process, at operation S203 instead of operation S3, it is determined whether or not the BD signal is detected five times within $t_D+\alpha$ as shown in FIG. 12. And if it is not detected five times (S203: No), the process returns to operation S2 to detect the next BD signal. On the other hand, if the BD signal is detected five times within $t_D+\alpha$ (S203: Yes), the process proceeds to operation S204 instead of operation S4, where it is determined whether or not the detection interval of the latest two BD signals is larger than $(t_A+t_B)/2$. If the interval is smaller than or equal to $(t_A+t_B)/2$ (S204: No), the process proceeds to operation S2, which is previously described. Whereas, if the interval is larger than $(t_A+t_B)/2$ (S204: Yes), the scanning is determined as the first way, whereby the process proceeds to operation S5, which is previously described.

Also, in the third exemplary embodiment, when the scanning direction is changed from the first way to the second way, the BD signal is detected six times, whereby at operation S209 instead of operation S9, the process waits until the BD signal is detected six times and then proceeds to operation S11, which is previously described. Similarly, when the scanning direction is changed from the second way to the first way, the BD signal is also detected six times, whereby at operation S216 instead of operation S16, the process waits until the BD signal is detected six times, and then proceeds to operation S5, which is previously described. In this third exemplary embodiment, the image write timing for first way data and the image write timing for second way data can be correctly detected without being transposed, even though only one BD sensor is provided.

Fourth Exemplary Embodiment

Figure 13:
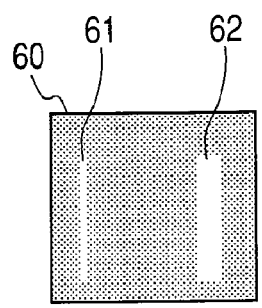
FIG. 13 is a front view showing the configuration of a slit plate for use in a laser scanner unit according to a fourth exemplary embodiment of the present invention.

A laser scanner unit 10 according to a fourth exemplary embodiment has the same configuration as the third exemplary embodiment, except for a slit plate 60 as shown in FIG. 13 provided instead of the slit plate 50, which is previously described. The slit plate 60 includes a thinner opening hole 61 which extends in the vertical direction and a thicker opening hole 62 which extends in the vertical direction and thicker than the opening hole 61, as shown in FIG. 13. That is, widths of the plurality of opening holes 61, 62 are asymmetrical in a scanning direction of the light beam L by the oscillating mirror 11.

Figure 14:
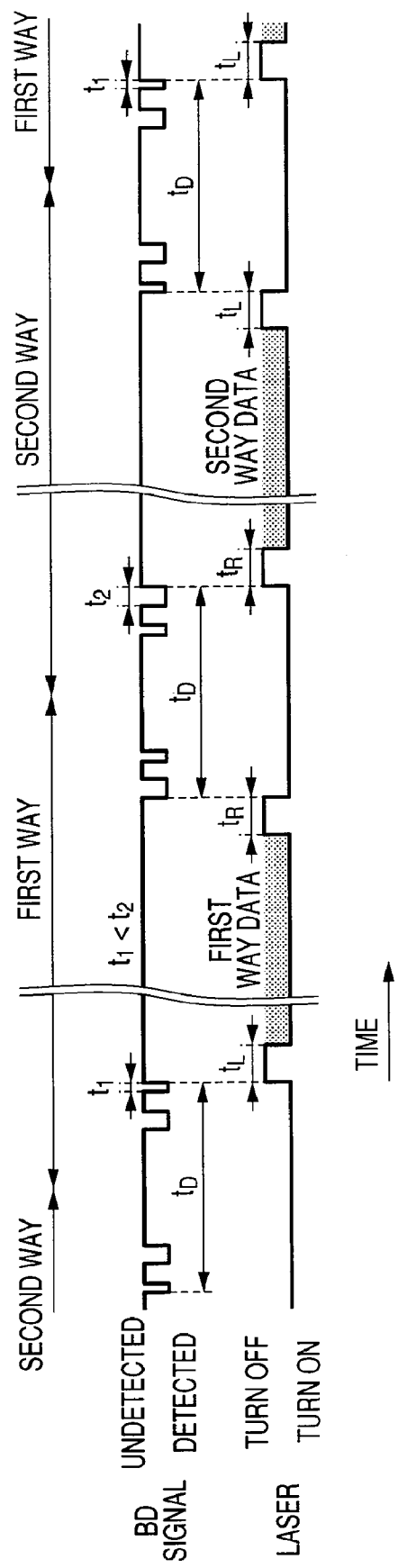
FIG. 14 is a time chart showing the operation of the laser scanner unit according to the fourth exemplary embodiment.

The detection pattern of a BD signal is shown in a time chart of FIG. 14. That is, in this case, when the laser beam L is scanned in the second way, the BD signal having a thinner pulse width (pulse width is assumed as $t_1$) corresponding to the thinner opening hole 61 is detected, and then the BD signal having a thicker pulse width (pulse width is assumed as $t_2$) corresponding to the thicker opening hole 62 is detected. Conversely, when the laser beam L is scanned in the first way, the BD signal having the thicker pulse width corresponding to the thicker opening hole 62 is detected, and then the BD signal having the thinner pulse width corresponding to the thinner opening hole 61 is detected.

Figure 15:
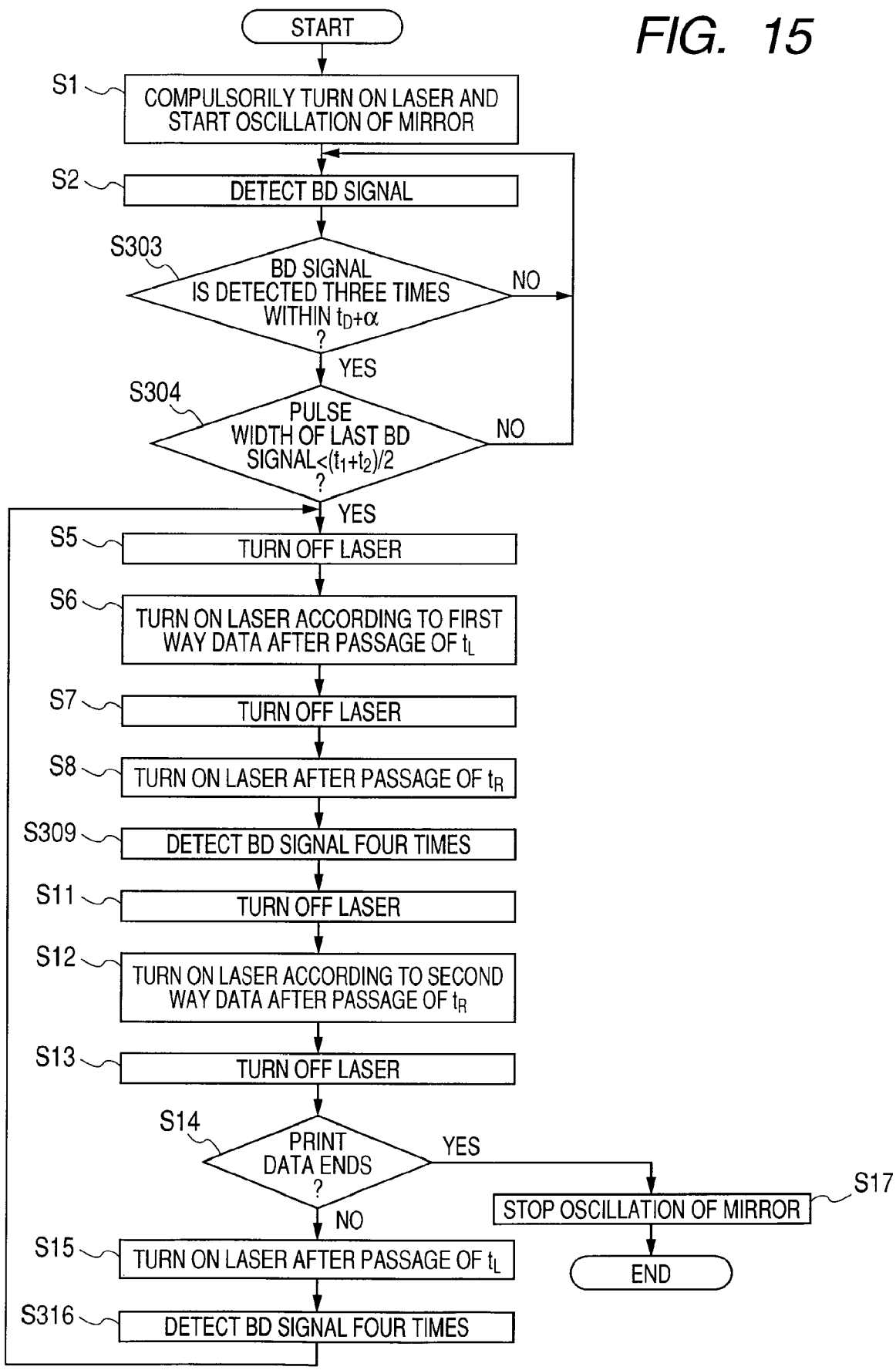
FIG. 15 is a flowchart showing a process with the laser scanner unit according to the fourth exemplary embodiment.

Therefore, in the fourth exemplary embodiment, a control is provided as shown in a flowchart of FIG. 15. Since the process of FIG. 15 is almost same as the process of FIG. 6, only the different operations from FIG. 6 will be described below.

In this process, at operation S303 instead of S3, it is determined whether or not the BD signal is detected three times within $t_D+\alpha$, as shown in FIG. 15. And if it is not determined three times (S303: No), the process returns to operation S2 to detect the next BD signal. On the other hand, if the BD signal is detected three times within $t_D+\alpha$ (S303: Yes), the process proceeds to operation S304 instead of operation S4, where it is determined whether or not the pulse width of the last BD signal is smaller than $(t_1+t_2)/2$. If the pulse width is larger than or equal to $(t_1+t_2)/2$ (S304: No), the process returns to operation S2, which is previously described. Whereas, if the pulse width is smaller than $(t_1+t_2)/2$ (S304: Yes), the scanning is determined as the first way, whereby the process proceeds to operation S5 as previously described.

Also, in this fourth exemplary embodiment, when the scanning direction is changed from the first way to the second way, the BD signal is detected four times, whereby at operation S309 instead of operation S9, the process waits until the BD signal is detected four times, and then proceeds to operation S11, which is previously described. Similarly, when the scanning direction is changed from the second way to the first way, the BD signal is also detected four times, whereby at operation S316 instead of operation S16, the process waits until the BD signal is detected four times, and then proceeds to operation S5, which is previously described. In this fourth exemplary embodiment, the image write timing for first way data and the image write timing for second way data can be correctly detected without being transposed, even though only one BD sensor is provided.

Other Exemplary Embodiments

While the present invention has been shown and described with reference to certain exemplary embodiments thereof, it will be understood by those skilled in the art that various changes in form and details may be made therein without departing from the spirit and scope of the invention as defined by the appended claims.

For example, though at least two light guide mirrors 16 and 17 are provided in each of the above exemplary embodiments, if the BD sensor 18 is disposed at the position of one light guide mirror 16 or 17 to allow the laser beam L to be directly incident and the other light guide mirror 17 or 16 is directed to the BD sensor 18, one of the light guide mirrors may be omitted. Though the monochrome laser printer 1 is described in the above exemplary embodiments, the inventive concept of the present invention may be also applied to a color printer. Further, the inventive concept of the present invention may be also applied to the image forming apparatus but also to various kinds of light scanning device such as a bar code reader or a display device.

The present invention provides illustrative, non-limiting embodiments as follows:

A light scanning device comprises: a light source which emits a light beam; an oscillating mirror which oscillates rotationally and reflects the light beam to be scanned over a scanning range, the scanning range including a first scanning range and a second scanning range set across a center of the scanning range; a detection unit including a light receiving face, on which the light beam is incident, to detect the light beam; and first and second stationary mirrors which reflect the light beam reflected by the oscillating mirror to the first scanning range and the second scanning range, respectively, to be incident on the light receiving face of the detection unit, wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates.

A light scanning device comprises: a light source which emits a light beam; an oscillating mirror which oscillates rotationally and reflects the light beam to be scanned over a scanning range, the scanning range including a first scanning range and a second scanning range set across a center of the scanning range; a detection unit including a light receiving face, on which the light beam is incident, to detect the light beam; and a stationary mirror which reflect the light beam reflected by the oscillating mirror to the first scanning range to be incident on the light receiving face of the detection unit, wherein the light beam reflected by the oscillating mirror to the second scanning range is directly incident on the light receiving face of the detection unit, wherein an incident pattern of the light beam reflected by the first stationary mirror incident on the light receiving face of the detection unit while the oscillating mirror oscillates is different from an incident pattern of the light beam directly incident on the light receiving face of the detection unit while the oscillating mirror oscillates.

According to the above configuration, the oscillating mirror reflects the light beam emitted from the light source while the oscillating mirror oscillates rotationally in reciprocating manner. Also, at least one stationary mirror is provided, the light beam which the oscillating mirror reflects to the first scanning range or the second scanning range set across the center of the scanning range of the light beam with the oscillating mirror is incident on the light receiving face of the detection unit, which detects that the light beam is incident.

The incident pattern of the light beam reflected to the first scanning range incident on the light receiving face while the oscillating mirror oscillates and the incident pattern of the light beam reflected to the second scanning range on the light receiving face while the oscillating mirror oscillates are different from each other. Therefore, it can be determined whether the detection unit detects the light beam in the first scanning range or the second scanning range according to the incident pattern. Therefore, according to the light scanning device described above, the timing for first way and the timing for second way can be correctly detected without being transposed, even though only one detection unit is provided.

An angle between a direction from the oscillating mirror to the center of the scanning range and a direction from the oscillating mirror to the first stationary mirror may be different from an angle between a direction from the oscillating mirror to the center of the scanning range and a direction from the oscillating mirror to the second stationary mirror. In this case, the interval since the light beam reflected to the first scanning range or the second scanning range is incident on the light receiving face of the detection until the light beam is incident again on it after changing the scanning direction of the light beam is different between the first scanning range and the second scanning range. Accordingly, it is possible to determine whether the way is the first way or the second way according to the incidence interval of the light beam.

Also, the light scanning device further comprises a slit plate which is disposed in front of the light receiving face and includes a plurality of opening holes. The widths of the plurality of opening holes or an arrangement of the plurality of opening holes is asymmetrical in a scanning direction of the light beam by the oscillating mirror. In this case, since the incidence pattern of the light beam being incident on the light receiving face via the slit plate varies, it is possible to determine whether the way is the first way or the second way.

Further, the number of the first stationary mirror is different from the number of the second stationary mirror. In this case, the number of times that the light beam reflected to the first scanning range is reflected toward the light receiving face and the number of times that the light beam reflected to the second scanning range is reflected toward the light receiving face are different, whereby it is possible to determine whether the way is the first way or the second way.

An image forming apparatus comprises the light scanning device described above, a modulation unit which modulates the light beam emitted from the light source based on a detection timing of the light beam with the detection unit and image data of an image to be formed; a photoconductor on which an electrostatic latent image is formed by applying the light beam from the light scanning device; a developing unit which develops an electrostatic latent image formed on the photoconductor by depositing a developer; and a transfer unit which transfers the developer deposited by the developing unit onto a recording medium.

According to the above configuration, the light beam from the light scanning device is modulated by the modulation unit and applied, so that the electrostatic latent image is formed according to the image data on the photoconductor. The electrostatic latent image is developed with the developer deposited by the developing unit and the developed image with the deposited developer is transferred to the recording medium by the transfer unit, whereby the image is formed on the recording medium. Also, in the light scanning device, the write timing of electrostatic latent image for the first way and the write timing of electrostatic latent image for the second way can be correctly detected without being transposed, even though only one detection unit is provided, as previously described. Accordingly, the image forming apparatus can form the correct image while the manufacturing costs are suppressed. And since the light scanning device can be reduced in size, due to the use of the oscillating mirror, the image forming apparatus can be easily reduced in size.

What is claimed is:

1. A light scanning device comprising:
   a light source which emits a light beam;
   an oscillating mirror which oscillates rotationally and reflects the light beam to be scanned over a scanning range, the scanning range including a first scanning range and a second scanning range set across a center of the scanning range;
   a detection unit including a light receiving face, on which the light beam is incident, to detect the light beam; and
   first and second stationary mirrors which reflect the light beam reflected by the oscillating mirror to the first scanning range and the second scanning range, respectively, to be incident on the light receiving face of the detection unit,
   wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates, and
   wherein the number of the first stationary mirror is different from the number of the second stationary mirror.

2. The light scanning device according to claim 1,
   wherein an angle between a direction from the oscillating mirror to the center of the scanning range and a direction from the oscillating mirror to the first stationary mirror is different from an angle between a direction from the oscillating mirror to the center of the scanning range and a direction from the oscillating mirror to the second stationary mirror.

3. A light scanning device comprising:
a light source which emits a light beam;
an oscillating mirror which oscillates rotationally and reflects the light beam to be scanned over a scanning range, the scanning range including a first scanning range and a second scanning range set across a center of the scanning range;
a detection unit including a light receiving face, on which the light beam is incident, to detect the light beam;
first and second stationary mirrors which reflect the light beam reflected by the oscillating mirror to the first scanning range and the second scanning range, respectively, to be incident on the light receiving face of the detection unit; and
a slit plate which is disposed in front of the light receiving face and includes a plurality of opening holes,
wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates, and
wherein widths of the plurality of opening holes or an arrangement of the plurality of opening holes is asymmetrical in a scanning direction of the light beam by the oscillating mirror.

4. The light scanning device according to claim 3,
wherein an angle between a direction from the oscillating mirror to the center of the scanning range and a direction from the oscillating mirror to the first stationary mirror is different from an angle between a direction from the oscillating mirror to the center of the scanning range and a direction from the oscillating mirror to the second stationary mirror.

5. A light scanning device comprising:
a light source which emits a light beam;
an oscillating mirror which oscillates rotationally and reflects the light beam to be scanned over a scanning range, the scanning range including a first scanning range and a second scanning range set across a center of the scanning range;
a detection unit including a light receiving face, on which the light beam is incident, to detect the light beam;
first and second stationary mirrors which reflect the light beam reflected by the oscillating mirror to the first scanning range and the second scanning range, respectively, to be incident on the light receiving face of the detection unit; and
a slit plate which is disposed in front of the light receiving face and includes first and second slits,
wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates, and
wherein a width of the first slit is different from a width of the second slit.

6. The light scanning device according to claim 5,
wherein an angle between a direction from the oscillating mirror to the center of the scanning range and a direction from the oscillating mirror to the first stationary mirror is different from an angle between a direction from the oscillating mirror to the center of the scanning range and a direction from the oscillating mirror to the second stationary mirror.

7. A light scanning device comprising:
a light source which emits a light beam;
an oscillating mirror which oscillates rotationally and reflects the light beam to be scanned over a scanning range, the scanning range including a first scanning range and a second scanning range set across a center of the scanning range;
a detection unit including a light receiving face, on which the light beam is incident, to detect the light beam;
first and second stationary mirrors which reflect the light beam reflected by the oscillating mirror to the first scanning range and the second scanning range, respectively, to be incident on the light receiving face of the detection unit; and
a slit plate which is disposed in front of the light receiving face and includes first to third slits arranged in order in a scanning direction of the light beam by the oscillating mirror,
wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates, and
wherein an interval between the first and second slits is different from an interval between the second and third slits.

8. The light scanning device according to claim 7,
wherein an angle between a direction from the oscillating mirror to the center of the scanning range and a direction from the oscillating mirror to the first stationary mirror is different from an angle between a direction from the oscillating mirror to the center of the scanning range and a direction from the oscillating mirror to the second stationary mirror.

9. An image forming apparatus comprising:
a light scanning device comprising:
  a light source which emits a light beam;
  an oscillating mirror which oscillates rotationally and reflects the light beam to be scanned over a scanning range, the scanning range including a first scanning range and a second scanning range set across a center of the scanning range;
  a detection unit including a light receiving face, on which the light beam is incident, to detect the light beam;
  first and second stationary mirrors which reflect the light beam reflected by the oscillating mirror to the first scanning range and the second scanning range, respectively, to be incident on the light receiving face of the detection unit; and
  a slit plate which is disposed in front of the light receiving face and includes a plurality of opening holes,
  wherein widths of the plurality of opening holes or an arrangement of the plurality of opening holes is asymmetrical in a scanning direction of the light beam by the oscillating mirror, and
  wherein an incident pattern of the light beam reflected by the first stationary mirror incident on the light receiving face of the detection unit while the oscillating mirror oscillates is different from an incident pattern of the light beam reflected by the second stationary mirror incident on the light receiving face of the detection unit while the oscillating mirror oscillates;

a modulation unit which modulates the light beam emitted from the light source based on a detection timing of the light beam with the detection unit and image data of an image to be formed;

a photoconductor on which an electrostatic latent image is formed by applying the light beam from the light scanning device;

a developing unit which develops an electrostatic latent image formed on the photoconductor by depositing a developer; and a transfer unit which transfers the developer deposited by the developing unit onto a recording medium.

\* \* \* \* \*